Patented Oct. 28, 1947

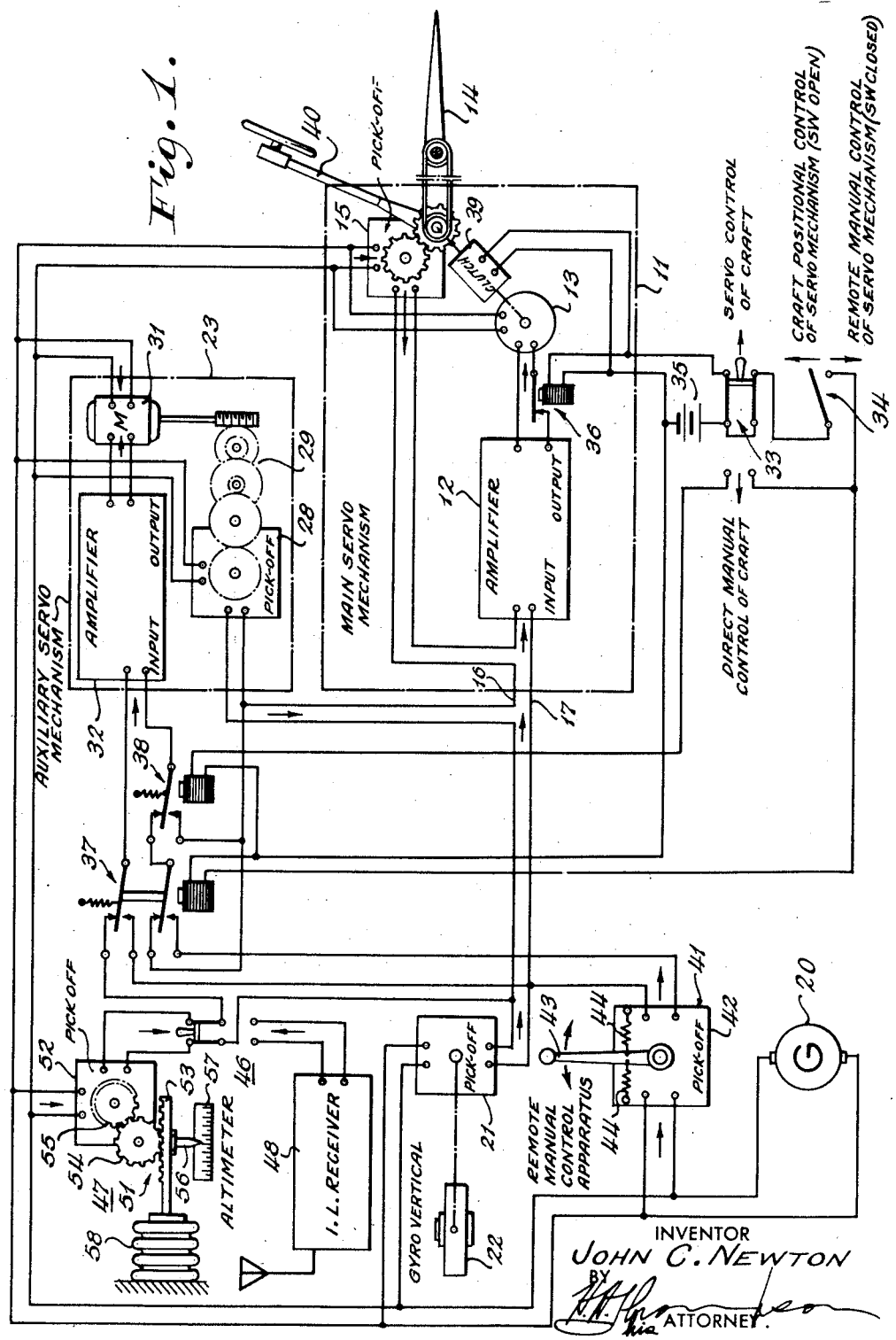

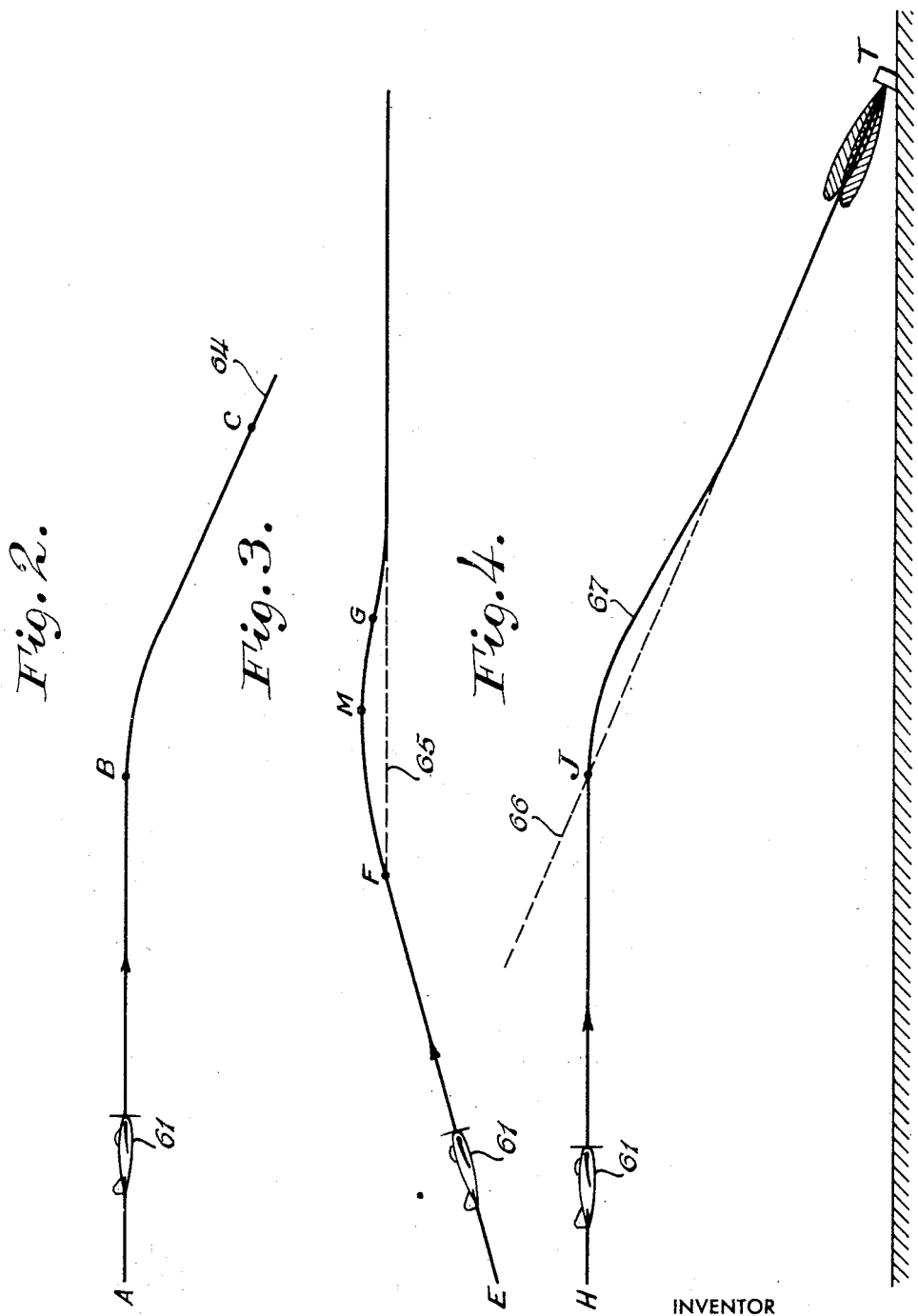

2,429,642

UNITED STATES PATENT OFFICE 2,429,642

CRAFT CONTROL APPARATUS

John C. Newton, Garden City, N. Y., assignor to Sperry Gyroscope Company, Inc., a corporation of New York Application October 26, 1945, Serial No. 624,842

13 Claims. (Cl. 172—282)

1

The present invention relates to a system for automatic control of a dirigible craft, and more particularly to the provision of smooth automatic control of attitude of a craft.

It is an object of the present invention to provide an improved system for the control of a dirigible craft.

Another object of the present invention is to provide an automatic control system capable of regulating the movements of a craft in such a way as to avoid abrupt deflections of the craft's control member, to prevent violent changes of craft attitude.

It is a further object of the present invention to provide a control system for a movable craft for permitting the control of the craft operation to be shifted from reliance upon one attitude-controlling reference device to reliance upon another such device without the production of abrupt deflections of the craft control member.

Yet a further object is to provide an automatic control system not only for providing for smooth transition from attitude control by one device to control by another device, but also for regulating the operation of a dirigible craft in response to a remote control device in such a way that ordinary manual control technique may be employed for controlling the craft through the use of the remote control device.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

Another object of the present invention is to provide an automatic pilot system for a steerable craft having selective direct manual control provision, and arranged so that a transfer from direct manual control of the craft to automatic control thereof is effected without a violent change of craft attitude.

Automatic control systems have been provided in dirigible craft for regulating the position of a craft attitude control member, such as the rudder of a boat or the rudder or elevator surface of an aircraft, in accordance with variation of a craft attitude-responsive signal from a sensitive positional pick-off on an instrument such as a directional gyroscope or a gyro-vertical. Moreover, arrangements have been devised for deflecting the craft attitude control member in accordance with relative variations between an attitude-responsive voltage component and a further voltage component, which latter has been made manually adjustable, or has been varied automatically in accordance with variations of the position of the craft. In such arrangements, a servo mechanism connected to a craft attitude control member has been arranged to receive these voltage components and to deflect the craft control member from its neutral position according to relative variations between the attitude-responsive voltage component and the further voltage component.

In accordance with the principles of hitherto devised automatic craft control systems such as aircraft automatic pilots, a change from manual control of a servo mechanism input voltage component to control thereof by a craft position-responsive device could be accomplished by inserting a position-responsive voltage component directly in the input circuit of the craft control member servo mechanism. At the time of a shift from a manually adjusted servo mechanism input voltage component to a position-responsive voltage component, or at the time of the opposite shift, any difference of the position-responsive voltage component and the manually adjusted voltage component would result in an abrupt change of the net servo mechanism input voltage, which would produce a violent change of craft attitude, with attendant discomfort for passengers in the craft.

This disadvantage of direct insertion and substitution of adjustable voltage components in the input circuit of a craft control member servo mechanism is overcome in the present invention by providing a main servo mechanism for deflecting the craft control member according to its input voltage, and an auxiliary servo mechanism for providing an output voltage component which is combined with the attitude-responsive component to control the main servo mechanism.

The auxiliary servo mechanism, which may be a mechanical structure including a variable speed motor driving a positional pick-off, may be manually controlled, as from a remote manual control device in the craft, or it may be controlled by a craft position-responsive device such as an altimeter or a radio instrument landing glide-path receiver.

This auxiliary servo mechanism, fixedly coupled to the input circuit of the main servo mechanism, and providing indirect control thereof in accordance with the auxiliary servo mechanism input signals, is used in the present invention to afford three principal features, as follows:

During direct manual control of the craft, while the main servo mechanism is not effective to influence the craft control member, the auxiliary servo mechanism operates to supply an output voltage varying in accordance with variations of the attitude-responsive voltage component, so that the input voltage components of the main servo mechanism are maintained substantially balanced. By this automatic alignment of the auxiliary servo pick-off with the craft attitude, tending to suppress any net voltage appearing at the main servo input circuit, the auxiliary servo mechanism preconditions the automatic pilot system for a smooth transition to automatic control of the craft.

Secondly, during automatic control of the craft, the auxiliary servo mechanism, remaining connected to the input circuit of the main servo mechanism, supplies a constant voltage component to the main servo input circuit in the absence of a signal applied to the auxiliary servo input circuit, so that when the auxiliary servo input circuit is transferred from one signal-producing device to another, the voltage at the input circuit of the main servo mechanism is held constant until the transfer is completed. Thereafter, the motor in the auxiliary servo mechanism drives the pick-off in a direction and at a speed dependent upon the signal applied to the input circuit of the auxiliary servo mechanism. Accordingly, no sudden change of input voltage of the main servo mechanism can occur, and so a shift from one attitude signal producing device to another is effected without any violent change of attitude of the craft.

Thirdly, a remote manual control device including a lever and a positional pick-off coupled thereto may be employed for supplying directly to the auxiliary servo input circuit signals of strength substantially proportional to deflections of the lever from a neutral position, so that the output voltage of the auxiliary servo mechanism is made to vary at a rate substantially proportional to the deflection of the control lever. As a result, the main servo mechanism varies the attitude of the craft at a rate substantially proportional to the deflection of the remote manual control lever, for so long as the lever remains deflected, so that the craft response to the manipulation of this lever corresponds closely to craft performance in response to direct manual deflection of the craft attitude control member.

Other objects and advantages will become apparent from the specification taken in connection with the accompanying drawings, wherein:

Fig. 1 illustrates an embodiment of the present invention employed for control of pitch of an aircraft; and Figs. 2, 3 and 4 illustrate the manner in which the present invention affords smoothness of control transition of a craft.

In Fig. 1 there is shown a main servo mechanism 11 arranged for controlling the attitude of a craft. This servo mechanism 11 includes a servo amplifier 12 and a servo motor 13 coupled to a craft control member 14 which, in the illustrated embodiment, is an elevator control surface of an aircraft. A positional pick-off 15 may be coupled to the control member 14 and arranged to provide an elevator deflection repeat-back signal in series with the input circuit of amplifier 12, so that the member 14 will be deflected from a neutral position by the servomotor 13 to an extent determined by the voltage supplied between main servo input conductors 16 and 17.

The main servo input voltage between these conductors comprises an attitude-responsive voltage component provided by a sensitive positional pick-off 21 coupled to a gyro-vertical 22, and an attitude-control voltage component supplied by an auxiliary servo mechanism 23. These components ordinarily are in polarity opposition or phase opposition, so that the net input voltage between conductors 16 and 17 is usually smaller than either component thereof. When this net input voltage has a finite intensity, the member 14 is deflected in such a way as to cause a change of attitude of the craft as required to bring the gyro-vertical pick-off to a position at which the attitude-responsive voltage component balances the attitude-control voltage component, the net input voltage thus being reduced to zero.

The gyro-vertical pickoff 21 is so arranged that it supplies an output voltage varying in magnitude according to the extent of variation of the pitch of the craft from a normal pitch attitude, and in phase or polarity according to the sense of variation of the pitch of the craft, i. e., according to whether the nose of the craft is inclined upward or downward. If an alternating voltage pick-off is employed, it may be made to supply an output voltage of a first phase when the craft takes a climbing attitude, or of the opposite phase when the craft is in a nose-down attitude for descent. If a direct-current pick-off is employed, the polarity of the pick-off output voltage may be relied on for indication of the sense of variation of the pitch of a craft.

The auxiliary servo mechanism 23 comprises a positional pick-off 28 driven through a speed reduction gear train 29 by a variable speed motor 31. This motor may have a constantly supplied winding connected to a uniform supply generator 20 and a speed- and direction-control winding supplied by the output circuit of amplifier 32.

The craft attitude pick-off 21, the auxiliary servo mechanism pick-off 28, and the elevator repeat-back pick-off 15 all may be connected to the generator 20 for substantially constant voltage excitation of these pick-offs, and the main servo motor 13 may have a constant energization input circuit also connected to generator 20.

Assuming a constant output voltage component supplied by the auxiliary servo mechanism 23, as when motor 31 is inactive, the main servo mechanism 11 operates to deflect the control member 14 as required to maintain the aircraft in an attitude characterized by a selected pitch angle, for which the attitude-responsive voltage component from pick-off 21 balances the voltage component from the auxiliary servo mechanism 23. If the attitude-control voltage introduced by auxiliary servo mechanism 23 into the main servo input circuit is varied, the main servo mechanism modifies the craft attitude until the condition of balance is restored between the attitude-responsive voltage component and the voltage component from the auxiliary servo mechanism 23.

Several devices are illustrated in Fig. 1 for selective control of the auxiliary servo mechanism. Any selected one of these devices may be coupled to the input circuit of the auxiliary servo mechanism 23, for supplying an attitude-controlling signal thereto. While the craft is operated under direct control of the main servo mechanism 11, a manual control apparatus 41, an altimeter apparatus 47 or an instrument landing radio receiver 48 may be employed for supplying the attitude-control signal to the input circuit of the servo mechanism 23. During direct manual control of the aircraft, on the other hand, the input circuit of the auxiliary servo mechanism 23 is connected across the input circuit of the main servo mechanism 11, for automatic alignment of the auxiliary servo pick-off with the attitude pick-off, and thus for suppressing relative variations of the main servo input voltage components.

The automatic craft control apparatus illustrated in Fig. 1 is provided with a main switch 33 for selection between servo control and direct manual control of the craft, the main servo mechanism 11 being disabled from influencing the craft attitude when switch 33 is set to the direct manual control position.

A further switch 34 is provided for selecting between remote manual control of the auxiliary servo mechanism 23 and automatic control thereof in accordance with a chosen craft position-responsive apparatus. The position-responsive apparatus may be either an altimeter equipped with a positional pick-off device, or a radio instrument landing receiver for producing an output voltage varying according to the position of the craft relative to a directive radio beam.

Switch 33 is arranged so that when its movable portion is thrown to the servo control position, a battery 35 is connected to energize a relay 36 which thereupon completes the circuit between the output terminals of amplifier 12 and the control voltage terminals of servo motor 13. When the movable portion of switch 33 is thrown to the opposite position, relay 36 is deenergized, disabling the servo mechanism from operating the craft attitude control member 14, and the battery 35 is connected to energize a double-pole, double-throw relay 37 and a single-pole, double-throw relay 38. An electrically operated clutch 39 may be provided for selectively coupling servo motor 13 to the craft control member 14 and selectively decoupling the motor from the control member, according to whether clutch 39 is energized or deenergized. This clutch may be used in addition to relay 36, as shown, or either may be used alone. When the movable portion of switch 33 is thrown to the left for disabling the main servo mechanism, the craft control member 14 may be directly manually controlled by manual control column 40.

When relays 37 and 38 are energized through switch 33, their movable contact elements are drawn downward, and the input circuit of the auxiliary servo amplifier 32 is connected to conductors 16 and 17, and thus is connected in parallel with the input circuit of the main servo mechanism 11. Any voltage then appearing in the input circuit of the main servo mechanism 11 due to an inequality or unbalance of the attitude-control voltage and the attitude-responsive voltage causes motor 31 to readjust pick-off 28 for restoring a condition of balance between the attitude-responsive voltage component and the attitude-control voltage component from auxiliary servo mechanism 23, reducing the main servo net input voltage substantially to zero. Thus, the auxiliary servo mechanism operates while the main servo mechanism is disabled from craft control, to forestall any violent change of craft attitude when the movable portion of switch 33 is thrown to the servo control position.

With the main switch 33 in the servo control position, the input circuit or amplifier 32 may be coupled either to a remote manual control device 41 for supervision of the craft attitude, or to a craft position-responsive device arranged for automatically regulating the craft attitude in order to overcome departures of the craft from a zone of travel.

When switch 33 is set for servo control of the craft, switch 34 is connected in series with the relay-energizing battery 35 and the coil of relay 37, and arranged so that this relay may be energized to transfer the input circuit of amplifier 32 from a craft positional signal source to the remote manual control device. When relay 37 is energized through switch 34, the input circuit of amplifier 32 is connected directly to the output circuit of the remote manual control apparatus 41. This apparatus may comprise a positional pick-off device 42 supplied with constant input voltage by generator 20, and connected to a manual control lever 43 which may be restrained to a neutral position by springs 44.

When the remote control lever 43 is manually deflected either forward or backward and retained so deflected, apparatus 41 produces an output signal of magnitude proportional to the extent of the deflection, and this signal, applied directly to the input circuit of the auxiliary servo mechanism 23, causes operation of the motor 31 at a speed substantially proportional to the extent of the deflection of the control lever. Accordingly, the main servo mechanism 11 operates to vary the attitude of the craft continuously at a rate substantially proportional to the deflection of the remote manual control lever, until the lever is returned to its neutral position. Thereafter, motor 31 ceases to drive pick-off 28, and the main servo mechanism 11 accordingly maintains the craft in the attitude then attained. The manner in which the auxiliary servo mechanism 23 and the main servo mechanism 11, in cooperation, cause the craft to respond to the manipulation of the remote control lever, thus corresponds closely to the manner in which direct manual deflection of the craft control member ordinarily affects the craft behavior. A significant difference, of course, is the apparent stability of the servo-controlled craft, evidenced by its maintenance of a fixed attitude while lever 43 remains at its neutral position.

When switch 34 is opened, relay 37 is deenergized and its movable contact elements are returned to the position in which they are shown in Fig. 1. The input circuit of amplifier 32 is thereupon connected for receiving signals representing variations of the craft position. A double-pole, double-throw switch 46 may be provided for selecting between an altitude-responsive signal apparatus 47 and an instrument landing radio receiver 48 as the position-responsive device for controlling the attitude of the craft through the servo mechanisms 23 and 11.

The altitude-responsive apparatus 47 may comprise a barometric altimeter 51 coupled to a sensitive positional pick-off 52. The altimeter 51 may include a bellows 58 fixedly positioned at one end and coupled at its opposite end to a rack 53, which may be coupled through gears 54 and 55 to the sensitive movable member of the positional pick-off 52. A pointer 56 may be attached to the rack 53 and arranged for cooperation with a scale 57 to indicate the actual altitude of the craft. If desired, provision may be made for selecting an altitude at which flight of the craft is to be regulated. For this purpose, the body of pick-off 52 may be arranged to be adjustably positioned, or a manually controlled differential may be employed for coupling the rack 53 to pick-off 52.

Instrument landing receiver 48 may be of the type providing reversible-polarity direct current output, as illustrated in United States Reissue Patent 22,484, to W. T. Cooke et al., May 23, 1944, or it may include a balanced-modulator converter such as is illustrated in United States Patent 1,664,455 for providing reversible-phase alternating current output. The choice of a direct current output or alternating current output instrument landing receiver will, of course, depend upon whether direct current pick-offs or alternating current pick-offs are employed.

When switch 46 is set as shown in Fig. 1, the output circuit of pick-off 52 is connected to the input circuit of the auxiliary servo mechanism 23, in series with the output circuit of the auxiliary servo mechanism. This connection provides a repeat-back signal component in series opposition to the position-responsive signal, so that the auxiliary servo mechanism 23 operates as a follow-up system tending to supply to the main servo input circuit a voltage component varying in accordance with the position-responsive signal. Accordingly, the net signal applied to the input terminals of amplifier 32 represents the difference of the altitude-responsive signal from pick-off 52 and the auxiliary servo output voltage from pick-off 28. If the voltage component supplied to the input circuit of the main servo mechanism by the auxiliary servo mechanism is unequal to the altitude-responsive signal from pick-off 52, the motor 31 is actuated to position pick-off 28 for overcoming the inequality of voltages, and thus for ultimately providing a main servo control voltage component equal or proportional to the altitude-responsive signal.

When the movable portion of switch 46 is thrown to the opposite position, the output circuit of the instrument landing receiver 48 is coupled to the input circuit of the amplifier 32 in opposition to the output voltage component from the auxiliary servo mechanism 23. Motor 31 is then made to position pick-off 28 for ultimately supplying a main servo input voltage component equal to the craft position-responsive signal from instrument landing receiver 48. By virtue of the indirect manner in which the craft positional voltage from altitude-responsive apparatus 47 or the instrument landing receiver 48 influences the control circuit of the main servo mechanism 11, no abrupt change of the main servo input voltage can result from a transfer of the auxiliary servo input circuit from one signal-supplying device to another. Accordingly, no violent change of craft attitude can result from such a transfer.

Positional pick-offs 15, 21, 28, 42 and 52 and the instrument landing receiver 48 all may be arranged to provide alternating output voltage, the generator 20 being an alternating voltage generator. In this event, the positional pick-offs may be of any well known type, such as pick-offs employing the variable transformer principle. For example, a Selsyn or Telegon transmitter unit may be used an an A. C. operated positional pick-off with one winding energized by generator 20 and a variably coupled winding employed as the output circuit. Such use of a Telegon transmitter is illustrated in U. S. patent application Serial No. 498,706, filed by E. C. Streeter, Jr., August 4, 1943. Many other types of positional pick-off devices for A. C. operation are well known to those skilled in the art of automatic pilot systems.

On the other hand, pick-offs 15, 21, 28, 42 and 52 and the instrument landing receiver 48 all may be arranged to provide direct current output, and one or more of the pick-offs may be supplied by a D. C. generator, or each pick-off may be supplied by a separate D. C. source. Pick-offs for D. C. operation may comprise potentiometers, having carbon or electrolytic or high-resistance wire elements. Electrolytic potentiometer pick-offs for D. C. operation and for A. C. operation are shown in U. S. Patents 1,702,404 and 1,702,405 to E. L. Holmes, issued February 19, 1929. Potentiometers employed as D. C. pick-offs are illustrated in U. S. Patent 2,423,337 of Francis L. Moseley, dated July 1, 1947.

The manner in which the automatic craft control apparatus shown in Fig. 1 insures smoothness of operation of a craft is illustrated in the somewhat exaggerated path views in Figs. 2, 3 and 4.

In Fig. 2, there is indicated, in elevation, the path of an aircraft 61 in level flight between points A and B. Craft 61 may be maintained in the level flight condition by the automatic control apparatus of Fig. 1, with switches 33, 34 and 46 positioned as shown in Fig. 1. At point B, let it be assumed that the movable portion of switch 33 is transferred to the left-hand position thereof, to provide for direct manual control of the craft. Thereafter, the pilot may operate the craft in such a way as to cause it to glide downward at an appreciable angle, along the path portion B—C. When the aircraft 61 has reached point C, and while it is headed downward in a gliding attitude, the movable portion of switch 33 may be thrown again to the right to reinstate servo control of the craft. If the positional pick-off 28 of the auxiliary servo mechanism 23 has remained fixedly positioned following the transfer at point B to direct manual control of the craft, this pick-off would still be set for substantially level flight of the craft; and accordingly, at the moment of reinstatement of servo control of the craft, there would be a violent change of craft attitude resulting from an abrupt change of input voltage.

However, by virtue of the automatic alignment feature of the present invention, during the interval of manual control of the craft 61 in its flight along path portion B—C, the motor 31 is actuated to vary the position of pick-off 28, and the output voltage thereof, in accordance with variations of the pitch of the craft. Now, if the pilot reinstates servo control of the craft 61 at point C by throwing the movable portion of switch 33 to the right, the output voltage component from pick-off 28 will be substantially equal to the output voltage component from the gyrovertical pick-off 21, so that the craft will pursue a momentarily unchanged course 64. Hence, a violent change of attitude of the craft at the moment of transfer to servo control is averted by the automatic alignment features of the present invention.

In Fig. 3 there is illustrated an elevation of the path which a craft may take after institution of automatic altitude control in accordance with the present invention. In this view, the craft 61 is shown climbing along a path portion E—F. During movement along this part of its path, the craft may be under remote manual control by apparatus 41 and the servo system 23, 11. The control lever 43 may have remained in its neutral position since a time preceding the arrival of the craft 61 at point E. During flight along path portion E—F, switch 33 is set for servo control of the craft, and switch 34 is set for remote manual supervision of the servo mechanism. Let it be assumed that switch 46 is positioned for connecting the altitude-responsive apparatus 47 to relay 37. Let it be further assumed that the point F is at an altitude of 10,000 feet and that the automatic altitude-responsive apparatus 47 is set for maintaining the craft 61 at an altitude of 10,000 feet. When the craft 61 reaches the point F, the pilot may open switch 34 for instituting craft positional control of the servo mechanisms in accordance with the output signal from the altitude-responsive apparatus 47.

If pick-off 52 were arranged to be connected directly into the input circuit of the main servo mechanism 11, then the institution of automatic altitude control at the point F would result in a violent change of attitude of the craft in an effort to modify its flight to straight-line level flight as indicated by the broken line 65. This would be true because the altitude-responsive voltage component would be zero at point F while the attitude-responsive voltage component would be appreciable, so that a large net voltage would be abruptly introduced into the main servo mechanism 11.

With the present invention, however, the institution of automatic altitude control under these conditions is not accompanied by an abrupt change in the net input voltage supplied to the main servo mechanism 11. The altitude-responsive signal is zero at F, but the repeat-back voltage supplied to the auxiliary servo input circuit upon the opening of switch 34 is an appreciable voltage representing the climbing attitude maintained between points E and F. Accordingly, motor 31, in response to the amplified difference signal supplied through amplifier 32, drives pick-off 28 toward a level-attitude position. In the meanwhile, the craft continues smoothly above the 10,000-foot altitude. The craft reaches a maximum altitude at M substantially at the time when a level attitude has been attained. At this point, the net input signal to the auxiliary servo mechanism is the altitude displacement signal, since the repeat-back signal is substantially zero at this time. Accordingly, motor 31 continues driving pick-off 28 in the direction toward nose-down attitude, and the craft commences to descend.

Thereafter, as the craft inclination (nose-down) increases, and the craft altitude decreases, the net signal applied to the auxiliary servo input circuit is gradually decreased because the downward-pitch repeat-back signal, though not yet as great as the altitude-responsive signal representing the displacement above the 10,000-foot level, is in opposition to the positional displacement signal. With further progress of the craft and continued operation of motor 31, the strentgh of the repeat-back signal increases and the strength of the craft positional signal decreases until, at point G, the craft attitude and the displacement above the 10,000-foot level are in such a ratio that the repeat-back signal balances the positional signal, with zero net input signal to amplifier 32 and motor 31. This arrests the increase of inclination of the craft. The downward glide toward the 10,000-foot level continues with the craft positional signal decreasing accordingly. The repeat-back signal therefore tends to exceed the positional signal, but motor 31, acting accordingly, varies the position of pick-off 28 for reduced downward inclination of the craft, maintaining the craft pitch inclination substantially proportional to its displacement above the 10,000-foot level. Therefore, the craft asymptotically approaches the desired flight altitude and its downward inclination is gradually reduced, until the 10,000-foot level is attained by the craft in substantially level flight.

The foregoing description of the craft operation depicted in Fig. 3 strikingly illustrates the smooth transitional characteristics achieved with automatic craft control in accordance with the present invention.

In Fig. 4 is illustrated an elevation of the path of the craft which results from transfer of the craft control from the altitude-responsive apparatus 47 to the instrument landing receiver 48. In this view, let it be assumed that the aircraft 61 is proceeding at a predetermined level, as for example, at 10,000 feet, under the control of the altitude-responsive apparatus 47. Accordingly, switches 33, 34 and 46 are set as shown in Fig. 1. The craft 61 arrives at point J at the intersection of the 10,000-foot level with an inclined glide path fixed in space by a directive radio transmitter T upon the ground, and indicated by the broken line 66 in Fig. 4.

Let it be assumed that, at the moment when the craft 61 reaches point J, the pilot transfers the movable portion of switch 46 from the automatic altitude-control position to the glide path receiver control position. An abrupt change of the voltage applied to the auxiliary servo mechanism 23 results from this transfer of switch 46, but the voltage change at the input circuit of the main servo mechanism 11 is a gradual change produced by the operation of motor 31, and the repositioning thereby of the positional pick-off 28. Accordingly, instead of undergoing such a violent change of attitude as would be necessary for abruptly changing from level flight to a glide along the path 66 toward the transmitter T, the craft is carried through a smoothly curving path 67, through which its attitude and its displacement from the path 66 are gradually modified until flight along the glide path 66 is achieved.

The flight conditions described in connection with Figs. 2, 3 and 4 are but a few illustrations of craft operations wherein the use of the present invention results in improved servo control characteristics of a dirigible craft.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Apparatus for selectively controlling the attitude of a craft in accordance with a signal and selectively permitting direct manual control of the craft attitude, comprising attitude-responsive means for supplying a voltage component varying in accordance with the attitude of the craft, signal-responsive means including a signal-receiving input circuit for supplying a further voltage component varying according to an input signal, servo mechanism having an input circuit coupled to said attitude-responsive means and said signal-responsive means for varying the attitude of said craft in accordance with relative variations of said voltage components, and means for disabling said mechanism from controlling said craft and coupling the input circuit of said signal-responsive means to the input circuit of said servo mechanism for varying said further voltage component in accordance with variations of said attitude-responsive voltage component during the disability of said servo mechanism.

2. Apparatus for selectively controlling the attitude of a craft in accordance with a signal and permitting direct manual control of the craft, comprising an attitude-responsive device for supplying a voltage component varying in response to variations of attitude of the craft, means for producing a variable voltage component, a servo mechanism responsive to said attitude-responsive voltage component and said variable voltage component for varying the attitude of said craft in accordance with relative variations of said components, and means for disabling said servo mechanism from controlling the attitude of said craft and varying said variable voltage component in accordance with said attitude-responsive voltage component during the period during which said servo mechanism is disabled.

3. Apparatus for selectively controlling the attitude of a craft in accordance with a signal and selectively permitting direct manual control of the craft attitude, comprising attitude-responsive means for supplying a voltage component varying in response to variation of attitude of the craft, signal-responsive means for supplying a voltage component varying according to an input signal applied thereto, servo mechanism coupled to said attitude-responsive means and to said signal-responsive means for varying the attitude of said craft in accordance with relative variations of said voltage components, craft attitude influencing apparatus for supplying to the input circuit of said signal-responsive means a signal for producing a change of attitude, and means for disabling said servo mechanism from attitude control of said craft and for regulating said voltage component in accordance with said attitude-responsive voltage component for suppressing relative variations of said components during direct manual control of said craft.

4. Apparatus for selectively controlling the attitude of a craft in accordance with a signal and selectively permitting direct manual control of the craft attitude, comprising attitude reference means for detecting variations of attitude of said craft, servo means responsive to said reference means for maintaining said craft in a selected attitude, means operatively coupled to at least one of said means for varying the attitude at which said attitude reference means and said servo means maintain said craft, and means for disabling said servo means from controlling the attitude of said craft and also for varying the attitude-maintaining characteristics of said servo means and attitude reference means in accordance with craft attitude variations for preconditioning said servo means for the institution of servo control of said craft.

5. Apparatus for controlling the operation of a dirigible craft, comprising voltage-responsive servo mechanism for controlling the attitude of said craft, means for producing a voltage component varying in response to variation of attitude of said craft, means for producing an attitude control voltage component, circuit means for applying to said servo mechanism a voltage varying according to the relative values of said components, means for producing a signal varying in response to variation of the position of said craft, and means for varying said attitude control voltage at a rate determined by the relative values of said position-responsive signal and said attitude control voltage.

6. Apparatus for controlling the operation of a dirigible craft, comprising means for producing a voltage varying in response to variation of attitude of said craft, means for producing an attitude control voltage, servo mechanism responsive to said voltages for controlling the attitude of said craft in accordance with the relative values thereof, means for producing a signal varying in response to variations of position of said craft, and means for varying said attitude control voltage at a rate and to an extent varying according to the relative magnitudes of said position-responsive signal and said attitude control voltage.

7. Apparatus for controlling the operation of a dirigible craft, comprising voltage-responsive servo mechanism for controlling the attitude of said craft, means for producing a voltage varying in response to variation of the attitude of said craft, means for producing an attitude control voltage, circuit means for applying to said servo mechanism a net voltage varying according to the relative magnitude of said attitude-responsive voltage and said control voltage, signal-responsive means for varying said attitude control voltage at an adjustable rate, means for producing a signal varying in response to variation of the position of said craft, and means for applying to said control voltage varying means a signal varying as the relative strengths of said attitude control voltage and said position-responsive signal.

8. Apparatus for controlling the operation of a dirigible craft, comprising voltage-responsive servo mechanism for controlling the attitude of said craft, means for producing a voltage component varying in response to change of attitude of said craft, means for producing an attitude control voltage component, circuit means for applying to said servo mechanism a servo control voltage varying as the relative values of said voltage components, means for varying said attitude control voltage at an adjustable rate, means for regulating the rate and extent of variation of said attitude control voltage in accordance with variation of the position of said craft, and selectively operable manual control means for adjusting the rate of variation of said attitude control signal.

9. Apparatus for controlling the pitch of a dirigible craft, comprising voltage-responsive means for varying the pitch of said craft, means for producing an attitude-responsive voltage varying in accordance with the pitch of said craft, means for producing a pitch control voltage, circuit means for combining said attitude-responsive voltage and said pitch control voltage and applying the combined voltage to said pitch varying means, a member movable about a reference position, and means responsive to the position of said member for varying said pitch control voltage at a rate determined by the displacement of said member from said reference position.

10. Aircraft pitch control apparatus, comprising servo mechanism for varying the pitch of said aircraft in accordance with an input voltage, signal-responsive means for supplying to said servo mechanism an input voltage varying at a rate determined by the strength of a signal applied thereto, a manually displaceable member, and means for supplying to said signal-responsive means a signal varying in strength according to the displacement of said member.

11. Relayed aircraft pitch control apparatus comprising a craft pitch-responsive voltage producing device including a gyroscope, servo mechanism responsive to said device for varying the pitch of said aircraft in accordance with an input voltage, signal-responsive means for supplying to said servo mechanism an input voltage varying at a rate determined by the strength of an applied signal, a manually displaceable control member, and means coupled to said member for supplying to said signal-responsive means a signal varying in strength according to the displacement of said control member, whereby said servo mechanism varies the pitch of said craft at a rate determined by the displacement of said control member.

12. Apparatus for controlling the operation of a dirigible craft selectively in accordance with a plurality of signal devices and for permitting a transfer of craft control from one of said devices to another without an abrupt change of attitude of the craft, comprising means for producing a voltage varying in response to variation of the attitude of said craft, means for producing an attitude control voltage, servo mechanism responsive to said voltages for varying the attitude of said craft in accordance with relative variations of said voltages, signal-responsive means for varying said attitude control voltage only in accordance with an input signal, and means for selectively coupling said signal-responsive means to any one of said signal devices, whereby said attitude control voltage remains unchanged while no input signal is applied to said signal-responsive means.

13. Apparatus for controlling the operation of a dirigible craft selectively in accordance with a plurality of signal devices and for permitting a transfer of craft control from one of said devices to another without a violent change of attitude of said craft, comprising means for detecting variation of the attitude of said craft, servo means responsive to said attitude variation detecting means for suppressing attitude variations of said craft, thereby tending to hold said craft at a fixed attitude, signal-responsive means coupled to one of the foregoing means for determining the attitude at which said craft is to be maintained and varying the maintained attitude according to an input signal, said signal-responsive means cooperating with said attitude variation detecting means and said servo means in the absence of an input signal to maintain said craft in a fixed attitude, and selector means coupled to said signal devices for connecting a selected signal device to said signal-responsive means, whereby the craft attitude is held substantially fixed during intervals between the disconnection of one signal device and the connection of another to said signal-responsive means, and is smoothly varied according to an input signal supplied by the connected signal device.

JOHN C. NEWTON.

Disclaimer 2,429,642.—*John C. Newton*, Garden City, N. Y. CRAFT CONTROL APPARATUS. Patent dated Oct. 28, 1947. Disclaimer filed Nov. 9, 1950, by the assignee, *The Sperry Corporation*.

Hereby enters this disclaimer to claim 4 of said patent.

[*Official Gazette December 5, 1950.*]

Disclaimer 2,429,642.—*John C. Newton*, Garden City, N. Y. CRAFT CONTROL APPARATUS. Patent dated Oct. 28, 1947. Disclaimer filed Jan. 25, 1951, by the assignee, *The Sperry Corporation*.

Hereby disclaims from the scope of claim 2 of said patent all means for producing a variable voltage component except means in which such component is for the purpose of and causes a change in the attitude of the craft from that otherwise determined by the attitude responsive device.

[*Official Gazette February 27, 1951.*]